July 19, 1955  W. P. SHUMAN, JR  2,713,602
ELECTRIC BATTERY
Filed April 13, 1954
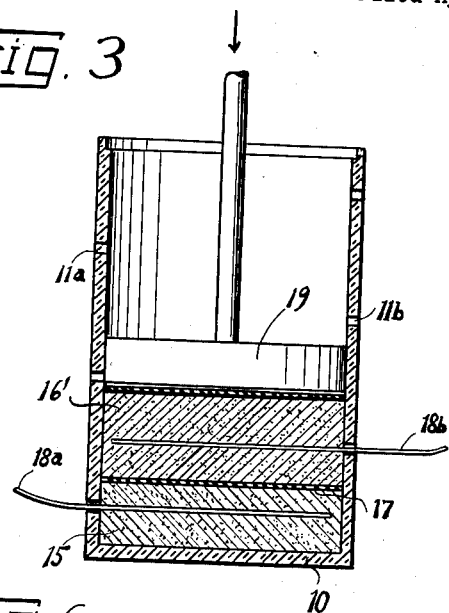
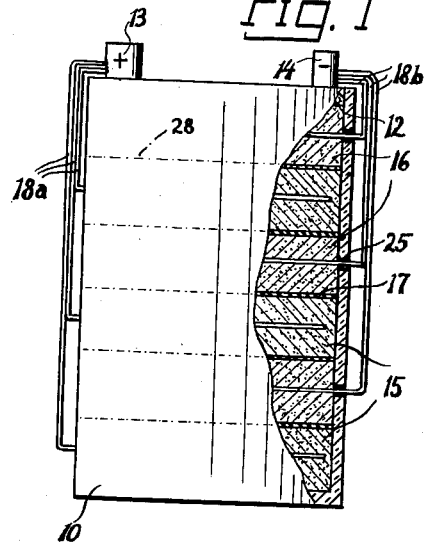
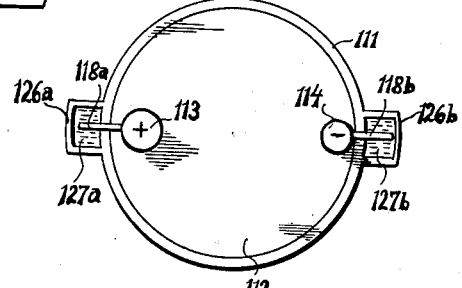
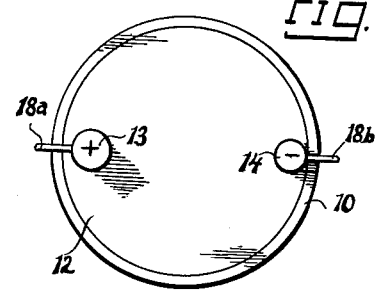
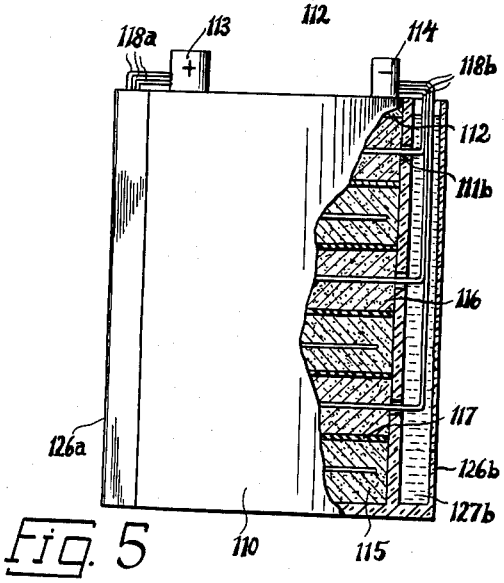
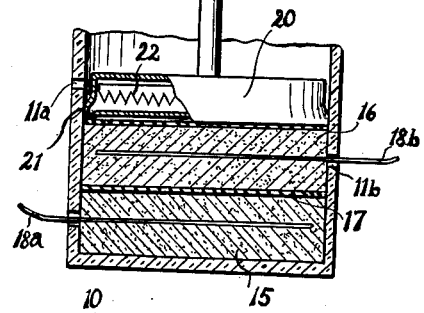
INVENTOR:
WILLIAM P. SHUMAN, Jr.
BY
Karl F. Ross
AGENT United States Patent Office 2,713,602
Patented July 19, 1955

2,713,602

ELECTRIC BATTERY

William Parks Shuman, Jr., Bethlehem, Pa.

Application April 13, 1954, Serial No. 422,795

6 Claims. (Cl. 136—111)

My present invention relates to electric primary or secondary batteries of the type wherein a set of electrodes, alternately of positive and negative polarities, are closely confined within a casing and applied under pressure against permeable or semi-permeable inter-electrode separators.

An object of my invention is to provide a more compact battery construction affording substantial savings in weight and volume over conventional batteries of the type referred to.

Another object of this invention is to provide a more rugged assembly adapted to withstand stresses due to gas evolution when the casing is sealed tight against the atmosphere, thereby enabling construction of a leak-proof battery.

A further object of the present invention is to provide a novel and expeditious method of quickly and uniformly assembling a series of batteries of the character set forth.

Still another object of my instant invention is to provide an improved inter-electrode separator particularly adapted to be used with a battery as described above, along with a process for operatively inserting such separator in the battery.

Yet a further object of the invention is to provide means for increasing the useful life of a rechargeable battery.

According to a feature of my invention, I provide a cylindrical casing of insulating, preferably plastic material in which the electrodes and the interelectrode separators are axially superposed upon one another. The separators are suitably cemented or, preferably, heat-sealed onto the casing to form fixed partitions subdividing the casing into a plurality of electrode compartments. The cylindrical casing wall is provided with side ports, each communicating with a respective electrode compartment, through which the electrolyte can be introduced after assembly and which may also receive the terminal leads extending outwardly from the several electrodes. These ports can be sealed after filling if a leak-proof battery is desired, the cylindrical shape of the casing enabling it to contain the developing gases and to cause their eventual reabsorption by the electrolyte.

Another feature of my invention resides in a manufacturing process whereby successive layers of electrode material, suitably separated according to polarity by permeable or semi-permeable membranes of preferably thermoplastic material, are placed within the cylindrical casing and compressed by piston strokes so that the necessary amount of active material is packed in the smallest possible space. Because the casing contains no air pockets, its own dimensions will be only slightly greater than those of the electrode assembly, whereby both volume and weight of the finished battery are considerably reduced.

A suitable semi-permeable separator material, which can be thermally fused with the casing wall, is a sheet of cation exchange resin such as a high polymer having sulfonic, carboxylic or phenolic groups, or a membrane of sintered thermoplastic material such as polyvinyl chloride or polyethylene.

The invention will be more fully described with reference to the accompanying drawing in which:

Fig. 1 is an elevational view, partly in section, of a battery embodying the invention;

Fig. 2 is a top plan view of the battery shown in Fig. 1;

Fig. 3 is a sectional elevation of the battery during assembly, showing one manufacturing step;

Fig. 4 is similar to Fig. 3, showing another manufacturing step;

Fig. 5 is a view similar to Fig. 1 but showing a modified battery according to the invention; and Fig. 6 is a top plan view of the battery shown in Fig. 5.

The battery shown in Figs. 1–4 comprises a cylindrical casing 10 having side ports 11a, 11b and a tightly fitting cover 12 bearing terminals 13, 14. Held under pressure within the casing is an electrode assembly comprising positive electrodes 15, e. g. of silver and/or an oxide thereof, alternating with negative electrodes 16, e. g. of zinc and/or its oxide or hydroxide; these electrodes are separated from one another by semi-permeable, circular membranes 17 of thermoplastic material. Leads 18a extend from the positive electrodes 15 to terminal 13 by way of the left-hand side ports 11a, whereas leads 18b similarly extend from the negative electrodes 16 to terminal 14 by way of the right-hand side ports 11b.

In making the battery of Figs. 1–4, I may use a flat piston 19 (Fig. 3) for compacting the electrodes 15, 16, along with a heated piston 20 (Fig. 4) for thermally fusing the separators 17 onto the inner wall of casing 10. Piston 20 is shown provided with a peripheral bead 21, serving to heat the edge of each membrane 17 as well as an adjacent zone of casing 10, to form a fluid-tight seal therebetween. A heating unit 22 within the piston, illustrated diagrammatically, is connected to a source of current 23 by way of a manually or automatically operated switch 24.

I first form the lowermost electrode 15 by inserting a wire 18a through the lowermost port 11a and surrounding it with a measured quantity of active electrode material, such as silver powder. Next, a membrane 17 is placed atop the pile of electrode material and the piston 19 is lowered to compact the powder underneath the membrane to the shape of a cylindrical disk. Thereafter, the piston 20 is brought down upon the separator 17 and the switch 24 is closed for a time long enough to fuse the thermoplastic materials of this separator and of the casing 10. Now, a wire 18b is inserted through the lowermost port 11b and a measured quantity of active material 16' of opposite polarity, such as zinc oxide, is heaped upon the membrane 17 previously anchored within the casing. Another disk 17 is placed upon the pile 16' and the aforedescribed operations of pistons 19 and 20 are repeated as illustrated in Figs. 3 and 4. In like manner the remaining electrodes are formed, except that the cover 12 takes the place of a membrane 17 in the case of the uppermost electrode 16.

After the cover 12 has been sealed in place, the battery is immersed in a suitable electrolyte, such as a concentrated solution of potassium hydroxide, which enters through the ports 11a, 11b and permeates the electrodes 15, 16 as well as the separators 17. After a sufficient amount of electrolyte has been absorbed (as measured, for example, by the drop in resistance between leads 18a and 18b), the casing 10 is removed from the bath and its ports 11a, 11b are sealed with a suitable cement 25, e. g. a thermosetting compound. After the leads 18a, 18b have been soldered or otherwise attached to their respective terminals 13, 14, the battery is ready for charging and subsequent discharge.

The modified battery of Figs. 5 and 6 comprises a casing 110 of fundamentally cylindrical configuration but provided with wings 126a, 126b forming a pair of electrolyte chambers 127a, 127b. Cover 112, terminals 113, 114, electrodes 115, 116, separators 117 and leads 118a, 118b are similar to the analogously numbered elements of Figs. 1–4. The electrolyte chambers 127a, 127b are open at the top and contain the leads 118a, 118b, respectively; these chambers communicate with the interior of the cylindrical casing body by way of respective side ports of which only the right-hand ports 111b have been shown in Fig. 5.

The assembly of the battery of Figs. 5 and 6, which notwithstanding its open side ports such as 111b may be described as comprising a substantially sealed casing, differs from that of the previously discussed embodiment in that an excess of electrolyte is allowed to remain outside the casing proper within chambers 127a, 127b. This battery is, accordingly, adapted to be used where the rapidity of the reaction results in a serious depletion of electrolyte at one or the other set of electrodes so as to require a surplus of liquid, as well as under conditions conducive to excessive gassing precluding the use of a completely sealed unit.

The separators 17 or 117 may consist of any thermally sealable material which is sufficiently permeable to the electrolyte while offering the necessary resistance to penetration by harmful metal particles. This includes the aforementioned cation exchange resins, sintered polyvinyl chloride and sintered polyethylene. Thermal fusibility is, however, not essential since other types of separators (e. g. cellophane) could be secured in place by cementation.

It will be readily understood that in the highly compact device herein disclosed there will be no room for the detachment of active material from the electrode body to form inactive deposits reducing the capacity of the battery and that, for the same reason, there will not occur any major deformation of the electrodes liable to reduce separator compression and to cause weak spots conducive to the development of internal short circuits.

The invention is, of course, not limited to the specific embodiments described and illustrated but is capable of numerous modifications and adaptations without departing from the spirit and scope of the appended claims.

Thus, for example, the casing 10 (or 110) could be originally manufactured in sections, as indicated by dot-dash lines 28 in Fig. 1, each electrode being individually compacted in its respective casing section whereupon the several sections are bonded together with interposition of the separators 17 (or 117). This bonding of the casing sections may be effected with the aid of a suitable plastic solvent, e. g. ethylene dichloride.

I claim:

1. A method of making an electric battery which comprises the steps of forming a stack of electrodes within a casing having a closed end by filling a portion of said casing next to said closed end with comminuted active electrode material of one polarity, compacting said material to the shape of a disk, placing an electrolyte-permeable separator in face-to-face contact with said disk, bonding said separator to said casing along the entire periphery of said separator, placing comminuted active electrode material of opposite polarity in said casing next to said material, compacting the last-mentioned material to the separator, compacting the last-mentioned material to the shape of a disk, and proceeding in like manner for all of said electrodes; soaking said stack of electrodes in electrolyte; and substantially sealing said casing.

2. A method according to claim 1, wherein said separator is of thermally fusible material, said separator being bonded to said casing by heat.

3. A method of making an electric battery which comprises the steps of forming axially spaced side openings in an elongated casing having a closed end; forming a stack of electrodes within said casing by inserting a first conductor through the side opening nearest said closed end, placing a mass of comminuted active electrode material of one polarity in said casing around said conductor, forming said material into a first disk by compacting it against said closed end, placing an electrolyte-permeable separator in face-to-face contact with said disk, bonding said separator to said casing along the entire periphery of said separator, inserting a second conductor through the next one of said side openings, placing a mass of comminuted active material of opposite polarity in said casing around said second conductor, forming the last-mentioned material into a second disk by compacting it against said separator and said first disk, proceeding in like manner for all of said electrodes; sealing the other end of said casing by applying a cover under pressure against the last disk and bonding said cover to said casing; and introducing electrolyte into said casing by way of said side openings.

4. A method according to claim 3, further comprising the step of sealing said side openings following introduction of said electrolyte.

5. A method according to claim 3, wherein said separator is of thermally fusible material, said separator being bonded to said casing by heating along its periphery.

6. A method according to claim 3, comprising the further step of separately interconnecting the odd-numbered and the even-numbered ones of said conductors.

References Cited in the file of this patent

UNITED STATES PATENTS

| 480,384 | Dow | Aug. 9, 1892 |
| 1,285,660 | Ford | Nov. 26, 1918 |
| 1,513,913 | Kinsley | Nov. 4, 1924 |
| 2,636,851 | Juda et al. | Apr. 28, 1953 |
| 2,662,929 | Dague | Dec. 15, 1953 |

FOREIGN PATENTS

| 152,230 | Germany | June 14, 1904 |
| 678,847 | Great Britain | Sept. 10, 1952 |